(12) United States Patent
Park

(10) Patent No.: US 7,343,525 B2
(45) Date of Patent: Mar. 11, 2008

(54) METHOD AND APPARATUS OF DETECTING ERROR OF ACCESS WAIT SIGNAL

(75) Inventor: Soo-heen Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 10/860,642

(22) Filed: Jun. 4, 2004

(65) Prior Publication Data

US 2005/0066238 A1    Mar. 24, 2005

(30) Foreign Application Priority Data

Jun. 5, 2003   (KR) .................... 10-2003-0036329

(51) Int. Cl.
*G06F 11/00*   (2006.01)

(52) U.S. Cl. .................. 714/43; 710/18; 710/118; 710/36; 710/125; 714/42; 714/44

(58) Field of Classification Search ................... 714/43, 714/56
See application file for complete search history.

(56) References Cited

U.S. PATENT DOCUMENTS

| 5,819,112 | A | * | 10/1998 | Kusters | 710/36 |
| 6,023,776 | A | * | 2/2000 | Ozaki | 714/55 |
| 6,032,271 | A | * | 2/2000 | Goodrum et al. | 714/56 |
| 6,223,231 | B1 | * | 4/2001 | Mankude | 710/38 |
| 6,260,099 | B1 | * | 7/2001 | Gilbertson et al. | 710/240 |
| 6,553,476 | B1 | * | 4/2003 | Ayaki et al. | 711/204 |
| 6,594,787 | B1 | * | 7/2003 | Chesson | 714/56 |
| 6,748,464 | B2 | * | 6/2004 | Mori et al. | 710/36 |
| 6,816,928 | B1 | * | 11/2004 | Yoshii | 710/45 |
| 7,089,457 | B2 | * | 8/2006 | Stevens | 714/43 |
| 2002/0002641 | A1 | * | 1/2002 | Martwick | 710/36 |
| 2004/0139372 | A1 | * | 7/2004 | Moyer et al. | 714/43 |

FOREIGN PATENT DOCUMENTS

| KR | P1999-012409 | 2/1999 |
| KR | P2002-0068071 | 8/2002 |

* cited by examiner

*Primary Examiner*—Christopher McCarthy
(74) *Attorney, Agent, or Firm*—Roylance, Abrams, Berdo & Goodman, L.L.P.

(57) ABSTRACT

A method and an apparatus for detecting an error of an access wait signal are disclosed. The method comprises the steps of accessing the input/output (I/O) device according to an I/O control command of the electronic device to access the I/O device; and returning to an IDLE state after the electronic device generates error information representing an error of the access wait signal or performs access to the I/O device according to a transition of the access wait signal to a state for determining a delay of access to the I/O device. Therefore, with the method, even when the access wait signal transmitted from the I/O device to the electronic device erroneously maintains a signal state for delaying access to the I/O device, the electronic device can be released automatically from an access delayed state after a predetermined time period.

6 Claims, 5 Drawing Sheets

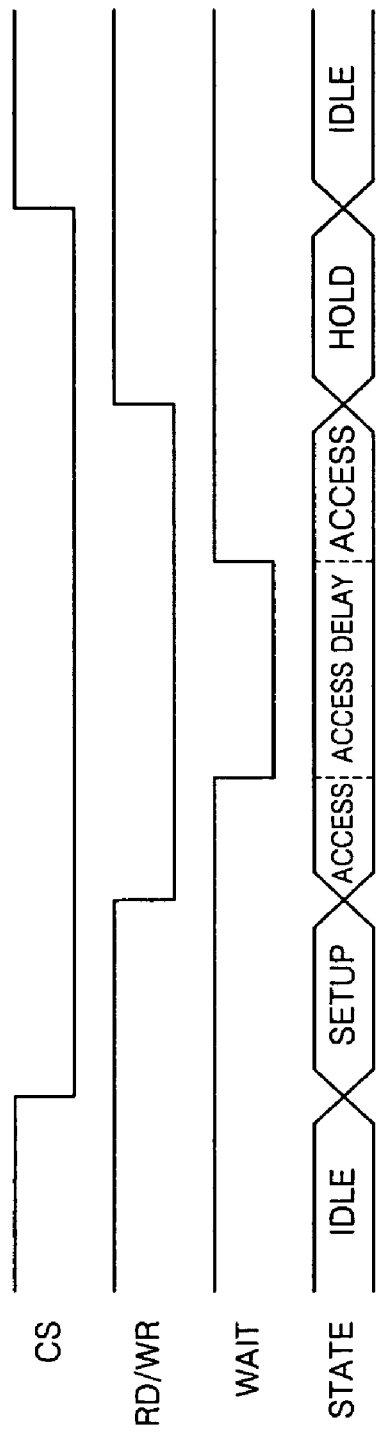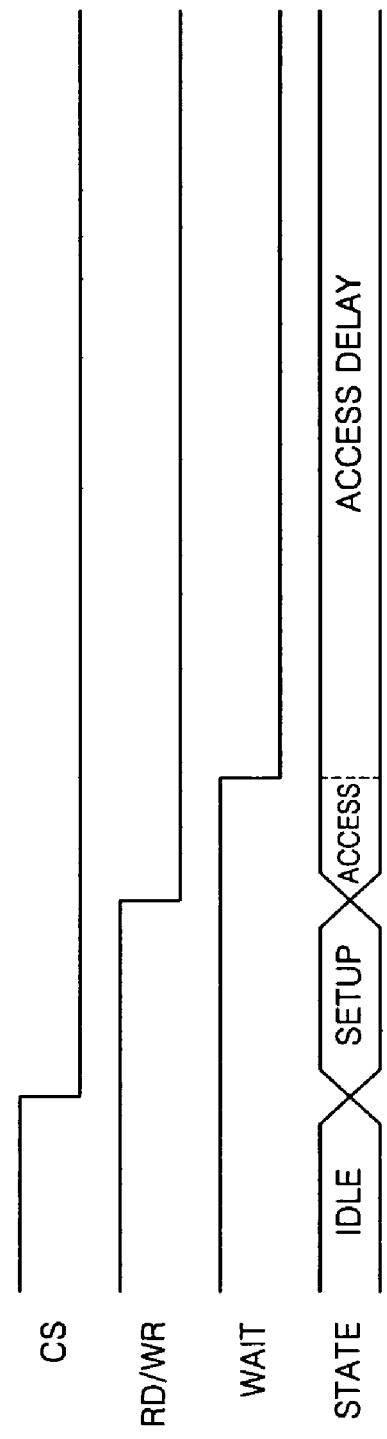

METHOD AND APPARATUS OF DETECTING ERROR OF ACCESS WAIT SIGNAL

PRIORITY

The present application claims the benefit under 35 U.S.C. § 119(a) of Korean Patent Application No. 2003-36329, filed in the Korean Intellectual Property Office on Jun. 5, 2003, the entire contents of which are herein incorporated by reference.

BACKGROUND OF THE INVENTION

1. Field of the Invention

The present invention relates to access to an input/output device connected to an electronic device including a computer or the like. More particularly, the present invention relates to a method and apparatus for detecting an error of an access wait signal transmitted to an electronic device from an input/output device.

2. Description of the Related Art

As used herein, an electronic device includes a computer, a printer or, in addition, any other electronic device provided with an input/output (I/O) controller. Input/output (I/O) devices are connected to an electronic device, and, for example, a PC card, a network card and the like are I/O devices. One of the signals typically output from such an I/O device is an access wait signal. The access wait signal is a signal which delays access from an electronic device when the I/O device is in a busy state due to processing another job.

The input/output controller included within the electronic device controls a connection between I/O devices and the electronic device.

FIG. 1 is a timing chart of transmission of a normal access wait signal of a conventional input/output (I/O) controller. As shown in FIG. 1, the I/O controller outputs a choice signal (CS) for selecting a particular I/O device among a plurality of I/O devices, and a read/write (RD/WR) signal corresponding to an input/output (I/O) control command. In addition, an internal operation of the I/O controller is comprised of the steps of an IDLE step, a SETUP step, an ACCESS step, an ACCESS DELAY step, a HOLD step, and an IDLE step. The IDLE state represents a state in which the I/O controller is initialized, the SETUP state represents a state in which a start of the internal operation to be performed according to an I/O control command is prepared. The ACCESS state represents a state in which an access to an I/O device is performed according to the I/O control command, an ACCESS DELAY state represents a state in which an access to the I/O device is delayed according to an access wait signal, and a HOLD state represents an intermediate state in which the I/O controller may proceed to another IDLE state after the access is normally finished.

The fact that a normal access wait signal (WAIT) shown in FIG. 1 is at a high level represents that access to an I/O device is possible, and the fact that the normal access wait signal (WAIT) is at a low level represents that access to the I/O device must be delayed. Therefore, as shown in FIG. 1, when the internal operation is changed from the IDLE state to the SETUP state, the choice signal is changed to the low level, and when the internal operation is changed from the SETUP state to the ACCESS state, the RD/WR signal is changed to the low level. Thereafter, when the access wait signal (WAIT) is changed to the low level, access to the I/O device is delayed until the access wait signal (WAIT) is changed to the high level. Then, when the access wait signal (WAIT) is changed to the high level, access is performed for as much time as is remaining out of a preset access time. The remaining access time diminishes according to the length of the access delay. Thereafter, the internal operation returns to the IDLE state via the HOLD state.

FIG. 2 is a timing chart of transmission of an abnormal access wait signal of a conventional I/O controller.

As shown in FIG. 2, when the access wait signal WAIT is not changed from the low level to the high level beyond a predetermined time period due to various factors such as unstableness of hardware, noise, or other unexpected electrical situations, the state of the I/O controller that reaches the ACCESS state via the SETUP state remains in the ACCESS DELAY state indefinitely. Accordingly, the interface signals such as the choice signal, and the RD/WR signal of the I/O controller cannot return to a normal operation, as shown in FIG. 2. As described above, when the electronic device cannot normally operate any more due to an error of the access wait signal, there is a problem in which important data stored in a memory, and functional operations being performed presently in an electronic device are invalidated since the only method to solve such an abnormal operation is to reset the electronic device in a hardware manner.

SUMMARY OF THE INVENTION

The present invention provides a method of detecting an error of an access wait signal transmitted to an electronic device from an input/output device so as to cause an electronic device to escape from an access delay state.

The present invention also provides an apparatus of detecting an error of an access wait signal so that the above method of detecting an error of an access wait signal can be carried out.

According to an aspect of the present invention, there is provided a method of detecting an error of an access wait signal which is performed with relation to the access wait signal transmitted from an input/output (I/O) device connected to an electronic device. The method comprises the steps of (a) accessing the I/O device according to an I/O control command of the electronic device to access the I/O device; and (b) returning to an IDLE state after the electronic device generates error information representing an error of the access wait signal or performs access to the I/O device, according to transition of the access wait signal determining delay of access to the I/O device. According to embodiments of the invention, the I/O device is initialized by the generated error information, or the electronic device ignores the erroneous access wait signal inputted to the electronic device.

According to another aspect of the invention, there is provided an apparatus for detecting an error of an access wait signal comprising an input/output controlling portion which, responding to an I/O control command for an electronic device to access an I/O device, generates error information representing an error of the access wait signal, or instructs an electronic device to perform access to the I/O device and then to return to an IDLE state, according to a transition of the access wait signal which determines delay of access to the I/O device. The apparatus also includes a limit time storing portion which stores a wait limit time corresponding to the maximum limit time during which the access wait signal can maintain the signal state determining delay of access to the I/O device. The apparatus also includes an error-information storing portion storing the generated error information, wherein the I/O device is initialized by the generated error information, or the electronic device ignores the erroneous access wait signal inputted to the electronic device.

BRIEF DESCRIPTION OF THE DRAWINGS

The above objective and advantages of the present invention will become more apparent by describing in detail exemplary embodiments thereof with reference to the attached drawings in which:

FIG. 1 is a timing chart of transmission of a normal access wait signal of a conventional input/output (I/O) controller;

FIG. 2 is a timing chart of transmission of an abnormal access wait signal of a conventional I/O controller;

Throughout the drawings, it should be understood that like reference numbers are used to depict like features and structures.

DETAILED DESCRIPTION OF THE INVENTION

A method of detecting an error of an access wait signal according to an embodiment of the present invention will now be described with reference to the attached drawings.

Figure 3:
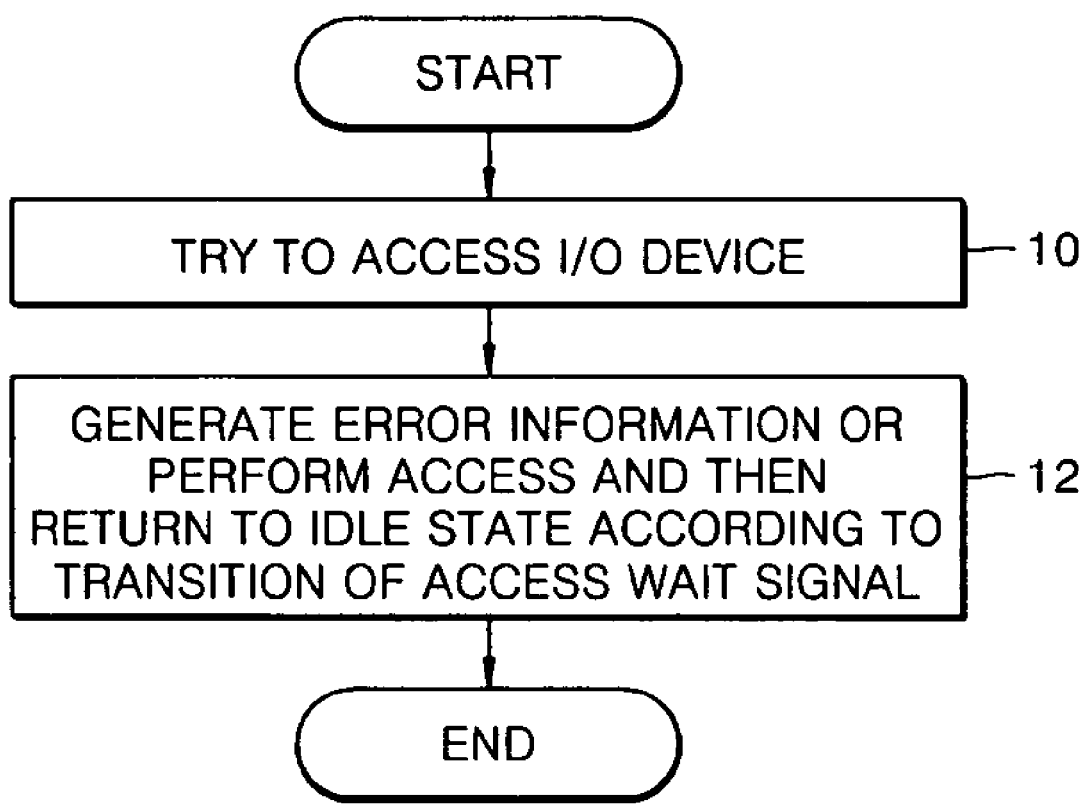
FIG. 3 is a flowchart illustrating a method of detecting an error of an access wait signal according to an embodiment of the present invention.

FIG. 3 is a flowchart illustrating a method of detecting an error of an access wait signal according to an embodiment of the present invention. Referring to FIG. 3, a method for detecting an error of an access wait signal according to an embodiment of the present invention is comprised of the steps of trying to access to an input/output (I/O) device (step 10), and returning to an IDLE state after generating error information or performing access to the I/O device according to transition of the access wait signal (step 12).

First, according to an input/output (I/O) control command to access to the I/O device, access to the I/O device is attempted (step 10). When the I/O control command is inputted to the electronic device, the electronic device tries to access the I/O device via the IDLE state and a SETUP state.

After step 10, error information representing an error of an access wait signal is generated or access to the I/O device is performed, according to a transition of the access wait signal which determines a delay of access to the I/O device, and then the device returns to the IDLE state (step 12).

Figure 4:
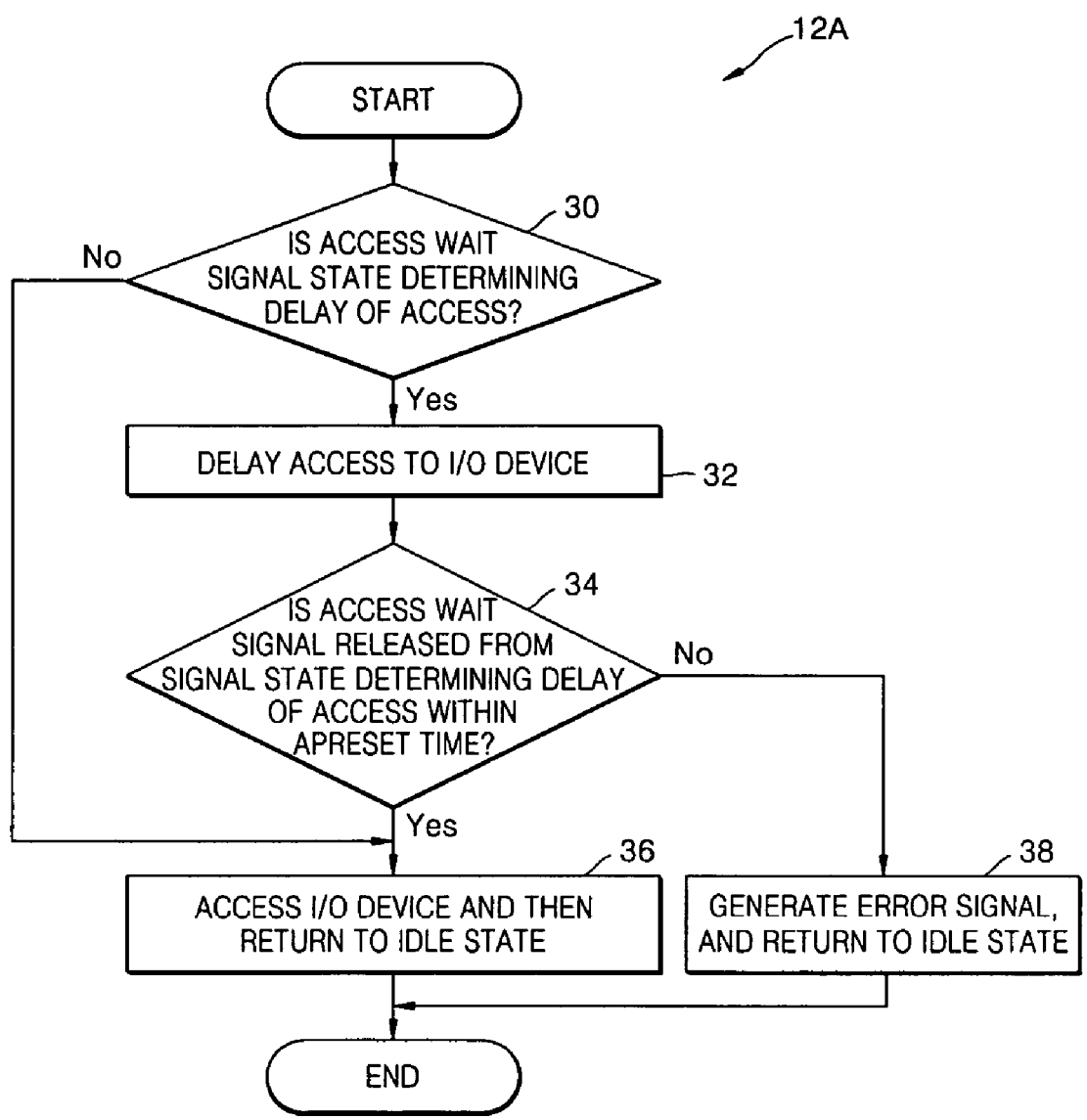
FIG. 4 is a flowchart illustrating an embodiment of step 12 shown in FIG. 3.

FIG. 4 is a flowchart illustrating an embodiment 12A of step 12 shown in FIG. 3. Step 12 is comprises performing access to an I/O device or generating an error signal according to whether or not an access wait signal is in a signal state determining a delay of access to the I/O device, and then returning to the IDLE state.

First, it is determined whether or not the access wait signal is in a signal state for determining delay of access to the I/O device (step 30). The signal state determining delay of access to the I/O device is, for example, a state in which the access wait signal is at a low level. When the access wait signal is at a high level, the electronic device decides that the access wait signal is not in the signal state for determining delay of access to the I/O device. It should be understood that in determining a delay of access according to whether the access wait signal is at a low level or at a high level, the signal level may be set either way.

When it is determined that the access wait signal is not in the signal state for determining a delay of access to the I/O device, step 36 follows step 30, such that the I/O device is accessed, and then the device returns to the IDLE state. For example, when it is decided that the access wait signal is at the high level, step 36 follows step 30.

However, when it is determined that the access wait signal is in the signal state for determining a delay of access to the I/O device, the electronic device delays access to the I/O device. For example, when it is determined that the access wait signal is in the low level, the electronic device delays access to the I/O device. Generally, access to the I/O device is performed within a preset access time. When the access wait signal is changed to the low level while access is performed within the preset access time, access to the I/O device is delayed.

After step 32, it is determined whether the access wait signal has been released from the signal state for determining a delay of access to the I/O device within a wait limit time (step 34). The wait limit time means the maximum limit time within which the access wait signal can maintain the signal state determining a delay of access to the I/O device. That the access wait signal is released from the signal state for determining a delay of access to the I/O device means that the state of the access wait signal is changed to a state in which access to the I/O device can be performed. For example, it is determined that the access wait signal is released from the signal state for determining a delay of access to the I/O device if the state of the access wait signal is changed from the low level to the high level within the above-mentioned wait limit time.

When it is determined that the access wait signal is released from the signal state for determining a delay of access within the wait limit time, the electronic device accesses to the I/O device, and then returns to the IDLE state (step 36). When it is determined that the access wait signal is released from the signal state for determining a delay of access, it means that the signal state is changed to a state in which the electronic device can continue to perform access to the I/O device, and, therefore, the electronic device performs access to the I/O device for as much time is remaining of the preset access timeafter the delay of access according to the access wait signal. Thereafter, the electronic device returns to the IDLE state via a HOLD state. The electronic device returned to the IDLE state controls access to the I/O device according to a new I/O control command.

However, when it is determined that the access wait signal is not released from the signal state for determining a delay of access to the I/O device within the wait limit time, the electronic device generates error information representing an error of the access wait signal, and returns to the IDLE state (step 38). That the access wait signal is not released from the signal state determining delay of access within the wait limit time means that the access wait signal maintains the signal state for determining a delay of access to the I/O device due to an error occurred when the access wait signal was transmitted from the I/O device to the electronic device. Therefore, the electronic device determines that the I/O device is continuously being in a busy state, and continues to delay access. In order to prevent the electronic device from continuously delaying access, when the access wait signal maintains the signal state for determining a delay of access to the I/O device beyond the wait limit time, the electronic device generates an error signal representing that the access wait signal is an error signal. Thereafter, the electronic device normally completes access to the I/O device. When the wait limit time is over, the electronic device automatically stops access, and returns to the IDLE state.

Figure 5:
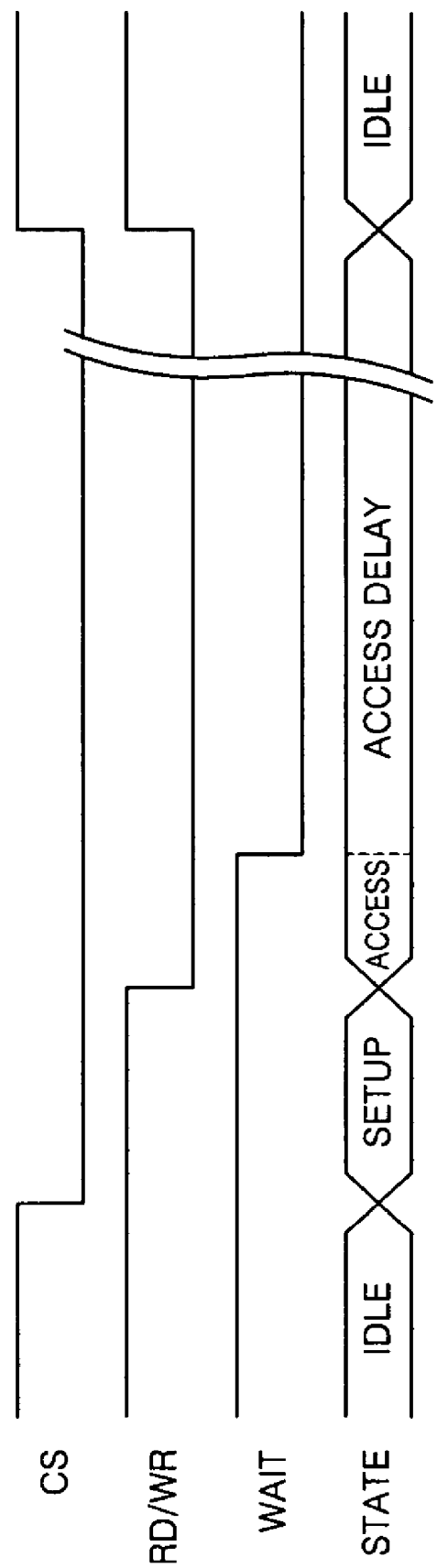
FIG. 5 is a timing chart of transmission of an abnormal access wait signal according to an embodiment of the present invention.

FIG. 5 is a timing chart of transmission of an abnormal access wait signal according to an embodiment of the present invention. As shown in FIG. 5, it can be seen that when the access wait signal maintains the signal state for determining a delay of access to the I/O device beyond the wait limit time, an access delay state is stopped, and the electronic device returns to the IDLE state.

In spite of an error of the access wait signal, since the electronic device automatically returns to the IDLE state when the wait limit time is over, that is to say, since the method according to an embodiment of the present invention is organized so that the I/O device can be initialized without resetting the electronic device or the electronic device can ignore an abnormal access wait signal, inconvenience due to occurrence of erroneous access wait signals can be reduced.

Now, an apparatus for detecting an error of an access wait signal according to an embodiment of the present invention will be described with reference to the attached drawings.

Figure 6:
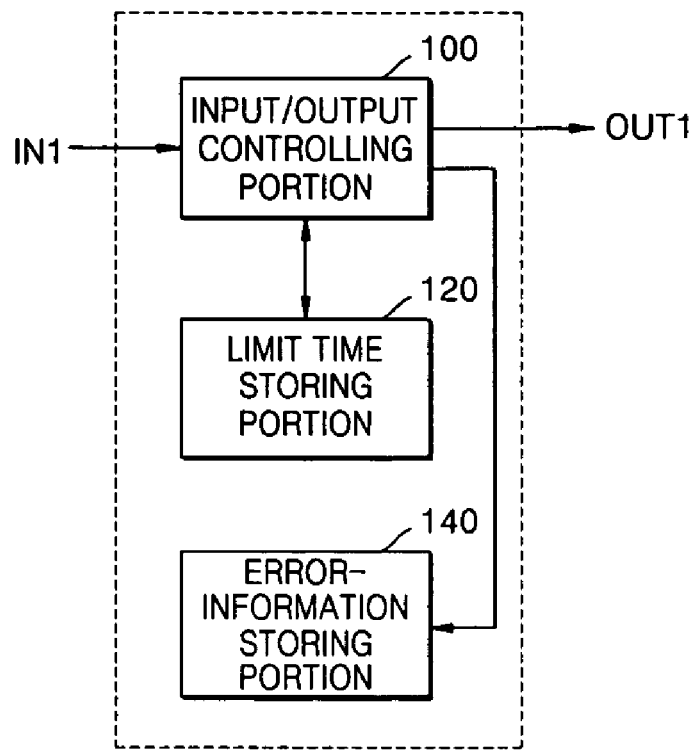
FIG. 6 is a block diagram illustrating an embodiment of of the present invention for detecting an error of an access wait signal.

FIG. 6 is a block diagram illustrating an apparatus for detecting an error of an access wait signal according to an embodiment of the present invention.

Referring to FIG. 6, an apparatus for detecting an error of an access wait signal according to an embodiment of the present invention comprises an input/output controlling portion 100, a limit time storing portion 120, and an error-information storing portion 140.

Responding to an I/O control command of an electronic device to access an I/O device, the input/output controlling portion 100 instructs an electronic device to access the I/O device, or generates error information representing an error of the access wait signal according to a transition of the access wait signal to a state for determining a delay of access to the I/O device. Responding to the I/O control command of the electronic device to access the I/O device which is inputted via an input terminal IN1, the input/output controlling portion 100 instructs the electronic device to access the I/O device according to a transition of the access wait signal, and outputs the instructed result through an output terminal OUT1. In addition, the input/output controlling portion 100 receives a wait limit time from the limit time storing portion 120 and generates error information according to a transition of the access wait signal, and outputs the generated error information to the error-information storing portion 140.

Figure 7:
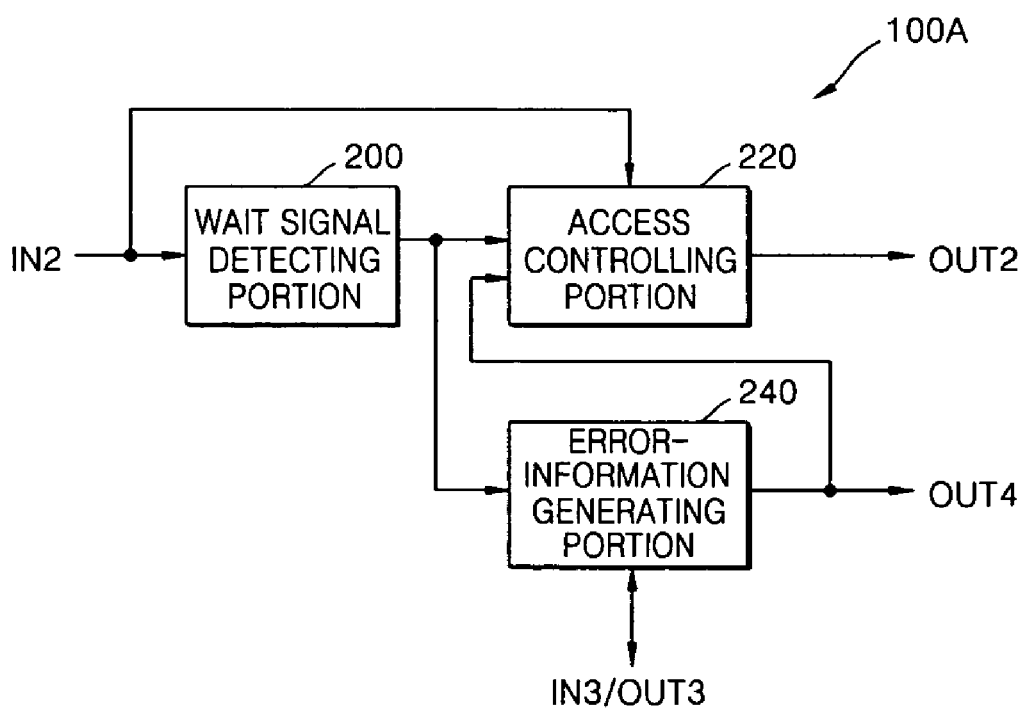
FIG. 7 is a block diagram illustrating an embodiment of the input/output controlling portion shown in FIG. 6.

FIG. 7 is a block diagram illustrating an embodiment of the input/output controlling portion shown in FIG. 6. The input/output controlling portion comprises a wait signal detecting portion 200, an access controlling portion 220, and an error-information generating portion 240.

The wait signal detecting portion 200 detects whether or not the access wait signal is in a signal state for determining a delay of access to the I/O device, and outputs the detected result as a detection signal. Responding to the I/O control command for the electronic device to access the I/O device which is inputted through an input terminal IN2, the wait signal detecting portion 200 detects whether or not the access wait signal is in a signal state for determining a delay of access to the I/O device, and outputs the detected result as a detection signal to the access controlling portion 220 and the error-information generating portion 240.

Responding to the I/O control command for the electronic device to access the I/O device, the access controlling portion 220 instructs the electronic device to access the I/O device, or, responding to the detection signal, delays access to the I/O device, or, responding to error information, instructs the electronic device to return to the IDLE state. Responding to the I/O control command of the electronic device to access the I/O device which is inputted through the input terminal IN2, the access controlling portion 220 instructs the electronic device to access the I/O device, and outputs the instructed result through an output terminal OUT2. In addition, responding to the detection signal inputted from the wait signal detecting portion 200, the access controlling portion 220 instructs the electronic device to delay access to the I/O device, and outputs the instructed result through an output terminal OUT2. In addition, responding to the detection signal that the access wait signal is released from the signal state determining delay of access to the I/O device within the wait limit time, the access controlling portion 220 instructs the electronic device to access the I/O device for the remaining access time, and instructs the electronic device to return to the IDLE state via the HOLD state. In addition, responding to the error information inputted from the error-information generating portion 240, the access controlling portion 220 instructs the electronic device to return to the IDLE state, and outputs the instructed result through the output terminal OUT2.

Responding to the detection signal, the error-information generating portion 240 generates error information. Responding to the detection signal inputted from the wait signal detecting portion 200, the error-information generating portion 240 requests the limit time storing portion 120 to send the wait limit time through an output terminal OUT3, receives input of the requested wait limit time through an input terminal IN3, generates the error information, and outputs the generated error information through an output terminal OUT4. For example, the error-information generating portion 240 receives input of the detection signal that the access wait signal is in the low state, detects whether or not the signal level of the access wait signal is changed from the low level to the high level within the wait limit time, and, when the access wait signal maintains the low level within the wait limit time, generates error information representing that the access wait signal is an error signal.

The limit time storing portion 120 stores a wait limit time corresponding to the maximum limit time during which the access wait signal can maintain the signal state determining delay of access to the I/O device. It is preferable that the wait limit time is set to be a time sufficiently longer than a normal access time.

The error-information storing portion 140 stores error information generated by the input/output controlling portion 100. The stored error information is utilized as information which causes the I/O device to be initialized or causes the electronic device to ignore an abnormal access wait signal inputted to the electronic device.

As described above, with the method and apparatus for detecting an error of an access wait signal according to an embodiment of the present invention, even when the access wait signal transmitted from the I/O device to the electronic device is transmitted as an error signal which causes the access wait signal to continuously maintain in the signal state for delaying access to the I/O device, the electronic device can be released automatically from an access delayed state after a predetermined time period, and the electronic device can continue to be operated normally without requiring a hardware reset of the electronic device.

What is claimed is:

1. A method of detecting an error of an access wait signal which is performed with relation to the access wait signal transmitted from an input/output (I/O) device connected to an electronic device, the method comprising the steps of:
   (a) accessing the I/O device according to an I/O control command of the electronic device to access the I/O device; and
   (b) returning to an IDLE state after the electronic device generates error information representing an error of the access wait signal or performs access to the I/O device, according to a transition of the access wait signal determining a delay of access to the I/O device,
   wherein the I/O device is initialized by the generated error information, or the electronic device ignores the erroneous access wait signal inputted to the electronic device.

2. The method according to claim 1, wherein the step (b) comprises the steps of:
   (b1) deciding whether or not the access wait signal is in a signal state for determining a delay of access to the I/O device;
   (b2) delaying access to the I/O device when it is decided that the access wait signal is in the state for determining a delay of access to the I/O device;
   (b3) deciding whether or not the access wait signal is released from the signal state for determining a delay of access to the I/O device within a wait limit time;
   (b4) returning to the IDLE state after the electronic device accesses the I/O device when it is decided that the access wait signal is released from the signal state for determining a delay of access to the I/O device within a wait limit time; and
   (b5) generating error information representing an error of the access wait signal, and returning to the IDLE state when it is decided that the access wait signal is not released from the signal state for determining a delay of access to the I/O device within a wait limit time,
   wherein, in the step (b1), when it is decided that the access wait signal is not in the signal state for determining a delay of access to the I/O device, the step (b4) follows the step (b1).

3. The method according to claim 2, wherein the step (b4) comprises returning to the IDLE state after the electronic device accesses the I/O device for as much time is remaining of a preset access time due to delay of access according to the access wait signal when it is decided that the access wait signal is released from the signal state for determining a delay of access to the I/O device within a wait limit time.

4. An apparatus for detecting an error of an access wait signal in an electronic device that receives an access wait signal from an I/O device connected to the electronic device, the apparatus comprising:
   an input/output controlling portion which instructs an electronic device to access the I/O device, or generates error information representing an error of the access wait signal in response to an I/O control command of an electronic device to access an I/O device, based on a transition of the access wait signal determining delay of access to the I/O device;
   a limit time storing portion which stores a wait limit time corresponding to the maximum limit time during which the access wait signal can maintain the signal state determining delay of access to the I/O device; and
   an error-information storing portion for storing the generated error information,
   wherein the I/O device is initialized by the generated error information, or the electronic device ignores the erroneous access wait signal inputted to the electronic device.

5. The apparatus according to claim 4, wherein the input/output controlling portion comprises:
   a wait signal detecting portion which detects whether or not the access wait signal is in the signal state for determining a delay of access to the I/O device, and outputs the detected result as a detection signal;
   an error-information generating portion which generates error information in response to the detection signal; and
   an access controlling portion which, responding to the I/O control command of the electronic device to access the I/O device, instructs the electronic device to delay access to the I/O device in response to the detection signal, or, instructs the electronic device to return to the IDLE state in response to the error information.

6. The apparatus according to claim 5, wherein the access controlling portion instructs the electronic device to access the I/O device for the remaining time of the preset access time, and instructs the electronic device to return to the IDLE state in response to the detection signal that the access wait signal is released from the signal state for determining a delay of access to the I/O device within the wait limit time.

* * * * *